(12) United States Patent
Stiles (10) Patent No.: US 8,734,049 B1
(45) Date of Patent: May 27, 2014

(54) ONE PIECE WATER PERMEABLE PAVER

(71) Applicant: Stiles Manufacturing, LLC, Houston, TX (US)

(72) Inventor: Barry J. Stiles, Houston, TX (US)

(73) Assignee: Barry J. Stiles, Houston, TX (US)

( * ) Notice: Subject to any disclaimer, the term of this patent is extended or adjusted under 35 U.S.C. 154(b) by 0 days.

(21) Appl. No.: 14/088,131

(22) Filed: Nov. 22, 2013

(51) Int. Cl.
*E01C 5/20* (2006.01)
*E01C 9/00* (2006.01)
*E01C 5/00* (2006.01)

(52) U.S. Cl.
CPC ............. *E01C 9/004* (2013.01); *E01C 5/006* (2013.01); *E01C 2201/06* (2013.01)
USPC .................. 404/37; 404/36; 404/40

(58) Field of Classification Search
CPC ...... E01C 2201/06; E01C 9/004; E01C 5/006
USPC ............ 404/27–41; 52/223.7; 15/161, 217
See application file for complete search history.

(56) References Cited

U.S. PATENT DOCUMENTS

| | | | | |
|---|---|---|---|---|
| 3,310,906 A | * | 3/1967 | Glukes | 446/95 |
| 4,111,585 A | * | 9/1978 | Mascaro | 404/70 |
| 4,440,818 A | * | 4/1984 | Buchan et al. | 428/99 |
| 4,749,302 A | * | 6/1988 | DeClute | 404/37 |
| 5,250,340 A | * | 10/1993 | Bohnhoff | 428/99 |
| 5,406,745 A | * | 4/1995 | Lin | 47/1.01 F |
| 5,848,856 A | * | 12/1998 | Bohnhoff | 405/36 |
| 6,451,400 B1 | * | 9/2002 | Brock et al. | 428/44 |
| 6,622,440 B2 | * | 9/2003 | Mercade | 52/177 |
| 7,114,298 B2 | * | 10/2006 | Kotler | 52/177 |
| 7,210,538 B2 | * | 5/2007 | Gust et al | 172/311 |
| 7,210,876 B2 | * | 5/2007 | Moralez et al. | 404/36 |
| 7,571,572 B2 | * | 8/2009 | Moller, Jr. | 52/177 |
| 7,815,395 B1 | * | 10/2010 | Blackwood | 405/50 |
| 7,950,191 B2 | * | 5/2011 | Brouwers | 52/180 |
| 2012/0163911 A1 | * | 6/2012 | Culleton et al. | 404/41 |

* cited by examiner

*Primary Examiner* — Raymond W Addie
(74) *Attorney, Agent, or Firm* — Buskop Law Group, PC; Wendy Buskop (57) ABSTRACT

A one piece water permeable paver for forming a surface suitable for traffic having outer flex joint connection cells connected to flex joints, outer three connection cells connected to one of the outer flex joint connection cells, outer two connection cells connected to two outer three connection cells, a plurality of inner single flex joint connection cells connected to one of the flex joints, and an inner dual flex joint connection cell engaging two flex joints, inner four connection cells connected to a pair of outer three connection cells and a pair of inner single flex joint connection cells. Fastening slots are formed partially through outer surfaces of cells that form two sides of the paver. Locking tabs extend from outer surfaces of cells forming two sides of the paver opposite the sides with the locking tabs, enabling a first paver to securely interlock to an adjacent paver.

19 Claims, 5 Drawing Sheets

ONE PIECE WATER PERMEABLE PAVER

FIELD

The present embodiments generally relate to a one piece water permeable paver forming a surface for traffic, such as a parking lot, a roadway, a golf cart path, a trail, a temporary roadway, a bicycle path, a jogging trail, a greenway space, a freight yard, a fire lane, a sidewalk, or another area where it is desirable for water to flow through rather than around a surface.

BACKGROUND

A need exists for a one piece water permeable paver that allows traffic and parking surfaces to be formed that enables grass to grow through the surface or contains aggregate, such as gravel, which allows water to permeate through the traffic and parking surface.

A need also exists for a one piece water permeable paver that can be a one piece molded unit created from recycled plastics, such as recycled milk bottles.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments relate to a one piece water permeable paver for forming a surface suitable for traffic.

The one piece water permeable paver prevents flash flooding and thereby costly property damage and loss of life, by managing water flow and drainage in areas that otherwise present solid surfaces with little or no ability to absorb water.

The one piece water permeable paver helps improve the environment by enabling the removing of diesel, gasoline, oil and other pollutants from storm water through natural bioremediation before these pollutants enter a natural aquifer and poison shrinking water supplies which could lead to serious illness or death.

The one piece water permeable paver helps reduce rising temperatures from climate change and helps reduce environmental damage done to the planet due to the dramatic heating effects caused by the use of concrete and asphalt for traffic and parking surfaces.

The one piece water permeable paver improves the health of the planet by utilizing and recycling post-consumer and industrial waste that clog landfills. The one piece water permeable paver uses plastic trash, and recycles the plastic trash into a construction material usable to build parking lots, roadways, sidewalks and other traffic surfaces, including golf cart trails.

The one piece water permeable paver helps improve lifestyles for the handicapped or disabled persons as well as improve lifestyles for the elderly and children by enabling the construction of unobstructed and safe park trail ways. This one piece water permeable paver enables the construction of access ways to nature conservancies by providing inexpensive, natural grass and gravel ADA compliant walkways. The invention enables the construction of trails that are level and safe, preventing broken bones and other serious injuries and even death due to a fall.

The one piece water permeable paver prevents fire disasters by creating erosion resistant structures that include grass filled fire lanes so fire and emergency vehicles don't get stuck in the mud or prevented from reaching remote areas in a disaster as often happens in wildfire situations in California.

The one piece water permeable paver enables police and emergency responders to quickly install a roadway in a muddy area to quickly access a damaged area, where a permanent roadway was washed away.

The one piece water permeable paver provides roadways for occasional use by emergency vehicles and fire trucks in areas where the expense of a concrete roadway or asphalt roadway is prohibitive. The one piece water permeable paver enables the creation of inexpensive fire lanes, emergency lanes and maintenance vehicle lanes.

The embodiments relate to a one piece water permeable paver which can be interlocked together to create a system for soil stabilization. Soil stabilization can be achieved by connecting a plurality of one piece water permeable pavers together and filling the cells of the water permeable pavers with soil or aggregate.

The embodiments relate to a one piece water permeable paver for use with a storm water management system. Storm water management can be achieved by connecting together a plurality of one piece water permeable pavers and installing the connected one piece water permeable pavers adjacent a bayou or waterway.

The embodiments relate to a road formed from connected one piece water permeable pavers which have the cells are filled with aggregate.

The embodiments relate to a parking lot formed from connected one piece water permeable pavers with cells filled with dirt or grass or aggregate. In embodiments, the parking lot is an occasional use event parking lot or an industrial parking lot for staging of oil field drilling equipment.

For the purpose of this application the following definitions will be used herein.

The term "cell" as used herein can refer to the cylindrical molded shapes which are connected to either other cells or to a flex joint to form the one piece water permeable paver. Cells can also be elliptical, rectangular, square or another polygon.

The term "inner flange" as used herein can refer to a sloped, triangular shaped structure when viewed in a side view that provides additional load support when each cell is filled with gravel, dirt, or aggregate. The inner flange specifically creates an increased surface area to prevent the one piece water permeable paver from being pushed into soil, keeping the paver level.

The term "parking marker" as used herein can refer to an insert, which can be plastic, and which provides a visual indicator creating parking zones or parking areas, and a plurality of the marking markers, used in a plurality of cells of the paver can create a parking series of dots, acting like a parking stripe. The plastic indicator can be non-deforming when driven over by a car.

Figure 1A:
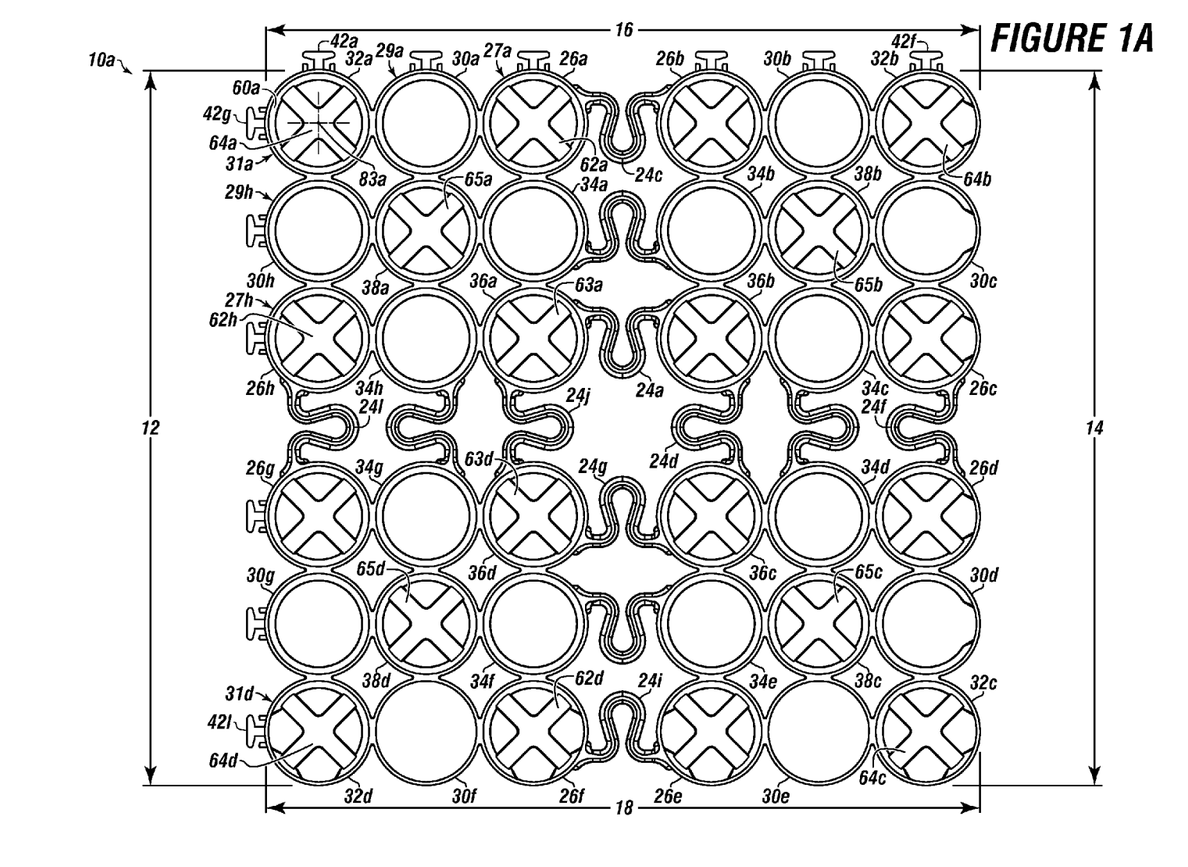
FIG. 1A depicts a top view of a one piece water permeable paver according to one or more embodiments.

Turning now to the Figures, FIG. 1A depicts a top view of a one piece water permeable paver according to one or more embodiments.

The one piece water permeable paver 10a can be made from a plurality of different types of cells connected to each other, to flex joints 24a-24l, or to both.

The one piece water permeable paver can have a first side 12, a second side 14 opposite the first side 12, a third side 16 between the first side 12 and the second side 14, and a fourth side 18 between the first side 12 and the second side 14 opposite the third side 16.

The one piece water permeable paver 10a can have a plurality of outer flex joint connection cells 26a-26h. Each outer flex joint connection cell can engage a flex joint from the plurality of flex joints 24a-24l.

Each outer flex joint connection cell can have an outer flex joint connection cell outer surface 27a-27h.

According to one or more embodiments, the one piece water permeable paver 10a can have a plurality of outer three connection cells 30a-30h.

Each outer three connection cell 30a-30h can be connected to one of the outer flex joint connection cells 26a-26h.

Each outer three connection cell can have an outer three connection cell outer surface 29a-29h respectively.

According to one or more embodiments, the one piece water permeable paver 10a can have a plurality of outer two connection cells 32a-32d.

Each outer two connection cell 32a-32d can connect to two adjacent outer three connection cells 30a-30h.

Each outer two connection cell can have an outer two connection cell outer surface 31a-31d.

According to one or more embodiments, the one piece water permeable paver 10a can have a plurality of inner single flex joint connection cells 34a-34h.

Each inner single flex joint connection cell 34a-34h can be connected to one of the flex joints 24a-24l.

According to one or more embodiments, the one piece water permeable paver 10a can have a plurality of inner dual flex joint connection cells 36a-36d.

Each inner dual joint connection cell can engage two flex joints simultaneously.

The one piece water permeable paver 10a can have a plurality of inner four connection cells 38a-38d.

Each of the inner four connection cells 38a-38d can connect to a pair of outer three connection cells 30a-30h and to a pair of inner single flex joint connection cells 34a-34h.

In embodiments, the one piece water permeable paver 10a can have an X-shaped anchor 62a-62h in each outer flex joint connection cell 26a-26h.

In embodiments, the one piece water permeable paver 10a can have an X-shaped anchor 63a-63d in each inner dual flex joint connection cells 36a-36d.

In embodiments, the one piece water permeable paver 10a can have X-shaped anchor 64a-64d in each of the outer two connection cells 32a-32d.

In embodiments, the one piece water permeable paver 10a can have an X-shaped anchor 65a-65d in each of the four connection inner cells 38a-38d.

Each cell can have a center point, such as outer two connection cell 32a having center point 83a.

In embodiments, the one piece water permeable paver can have the plurality of outer flex joint connection cells 26a-26h connecting adjacent cells at one of the clock positions: a 12 o'clock position, a 3 o'clock position, a 6 o'clock position and a 9 o'clock position.

In embodiments, the one piece water permeable paver can have the plurality of outer three connection cells 30a-30h connected to one adjacent outer flex joint connection cell 26a-26h, one adjacent outer two connection cell 32a-32d and one adjacent inner four connection cell 38a-38d at one of the clock positions: a 12 o'clock position, a 3 o'clock position, a 6 o'clock position and a 9 o'clock position.

In embodiments, the one piece water permeable paver can have the plurality of outer two connection cells 32a-32d connected to two adjacent outer three connection cells 30a-30h at one of the following clock positions on the outer surface of each cell: a 12 o'clock position, a 3 o'clock position, a 6 o'clock position and a 9 o'clock position.

In embodiments, the one piece water permeable paver can have the plurality of inner single flex joint connection cells 34l-34h connected to a flex joint 24a-24l at a clock position on the outer surface of each inner single flex joint connection cell that is at one of the clock positions: a 12 o'clock position, a 3 o'clock position, a 6 o'clock position or a 9 o'clock position.

In embodiments, the one piece water permeable paver can have the plurality of inner dual flex joint connection cells 36a-36d connected to a flex joint 24a-24l on the outer surface of each inner dual flex joint connection cell at one of the clock positions: a 12 o'clock position, a 3 o'clock position, a 6 o'clock position and a 9 o'clock position.

In embodiments, the one piece water permeable paver can have the inner four connection cells 38a-38d connected to adjacent cells at a clock position on the outer surface of each cell at one of the clock positions: a 12 o'clock position, a 3 o'clock position, a 6 o'clock position and a 9 o'clock position.

According to one or more embodiments, the one piece water permeable paver 10a can have a plurality of locking tabs 42a-42f extending from outer surfaces of cells forming the third side 16 of the one piece water permeable paver.

The one piece water permeable paver 10a can have a plurality of locking tabs 42g-42l extending from outer surfaces of cells forming the first side 12 of the one piece water permeable paver.

Each cell can have an inner flange 60a. Inner flange 60a is depicted on an outer two connection cell 32a.

Each inner flange can extend toward the center point 83 of each cell. Each inner flange can extend from the bottom of the one piece water permeable paver.

Figure 1B:
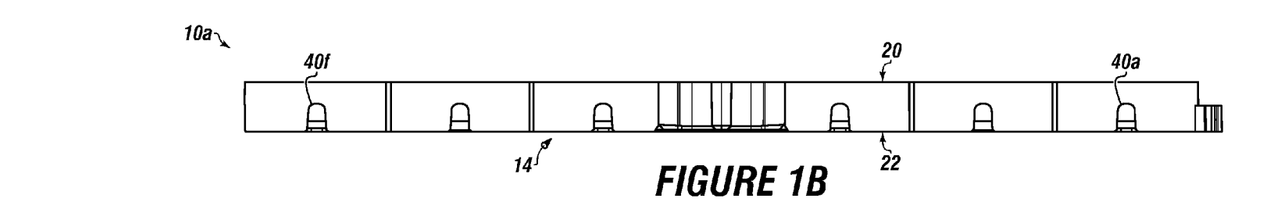
FIG. 1B depicts a side view of a second side of the one piece water permeable paver according to one or more embodiments.

FIG. 1B depicts a side view of the second side 14 of the one piece water permeable paver 10a according to one or more embodiments.

According to one or more embodiments, the one piece water permeable paver 10a can have a plurality of fastening slots 40a-40f formed partially through the cell outer surface of the cells of the second side 14.

In embodiments, the plurality of fastening slots 40a-40f can cut from the bottom 22 of the one piece water permeable paver 10a partially through the outer surface towards the top 20.

Figure 1C:
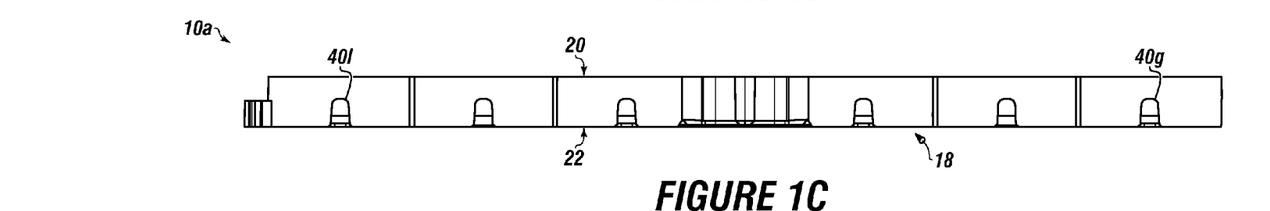
FIG. 1C depicts a side view of a fourth side of the one piece water permeable paver according to one or more embodiments.

FIG. 1C depicts a side view of the fourth side 18 of the one piece water permeable paver according to one or more embodiments.

The one piece water permeable paver 10a can have a plurality of fastening slots 40g-40l formed partially through the cell outer surface of cells that create the fourth side 18 of the one piece water permeable paver 10a.

In embodiments, the plurality of fastening slots 40g-40l can be cut from the bottom 22 partially through the outer surface towards the top 20.

Figure 1D:
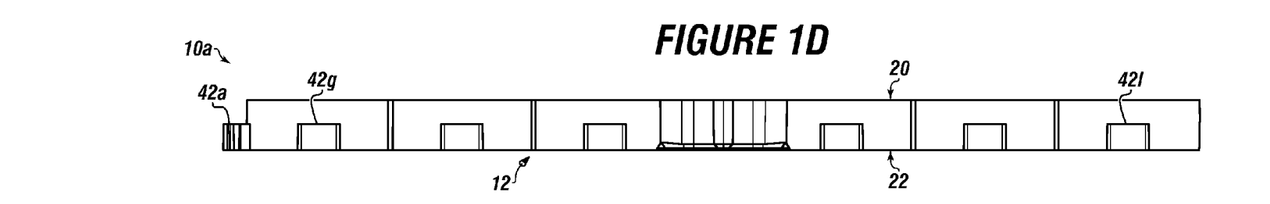
FIG. 1D depicts a side view of a first side of the one piece water permeable paver according to one or more embodiments.

FIG. 1D depicts a side view of the first side 12 of the one piece water permeable paver according to one or more embodiments.

The plurality of locking tabs 42g-42l can be formed on the outer surface of the outer cells extending from the bottom 22, opposite the top 20, of the one piece water permeable paver 10a. Locking tab 42a is also shown.

Figure 1E:
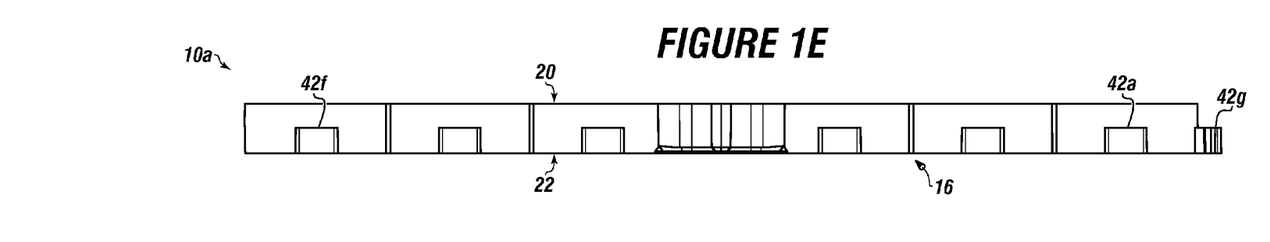
FIG. 1E depicts a side view of a third side of the one piece water permeable paver according to one or more embodiments.

FIG. 1E depicts a side view of the third side 16 of the one piece water permeable paver according to one or more embodiments.

The one piece water permeable paver 10a can have a plurality of locking tabs 42a-42f extending from each outer surface of cells extending from the bottom 22, opposite the top 20, of the one piece water permeable paver 10a. Locking tab 42g is also shown.

The locking tabs of a first one piece water permeable paver can interlock with the fastening slots of an adjacent one piece water permeable paver to create a roadway, trail, or similar traffic surface.

Figure 2:
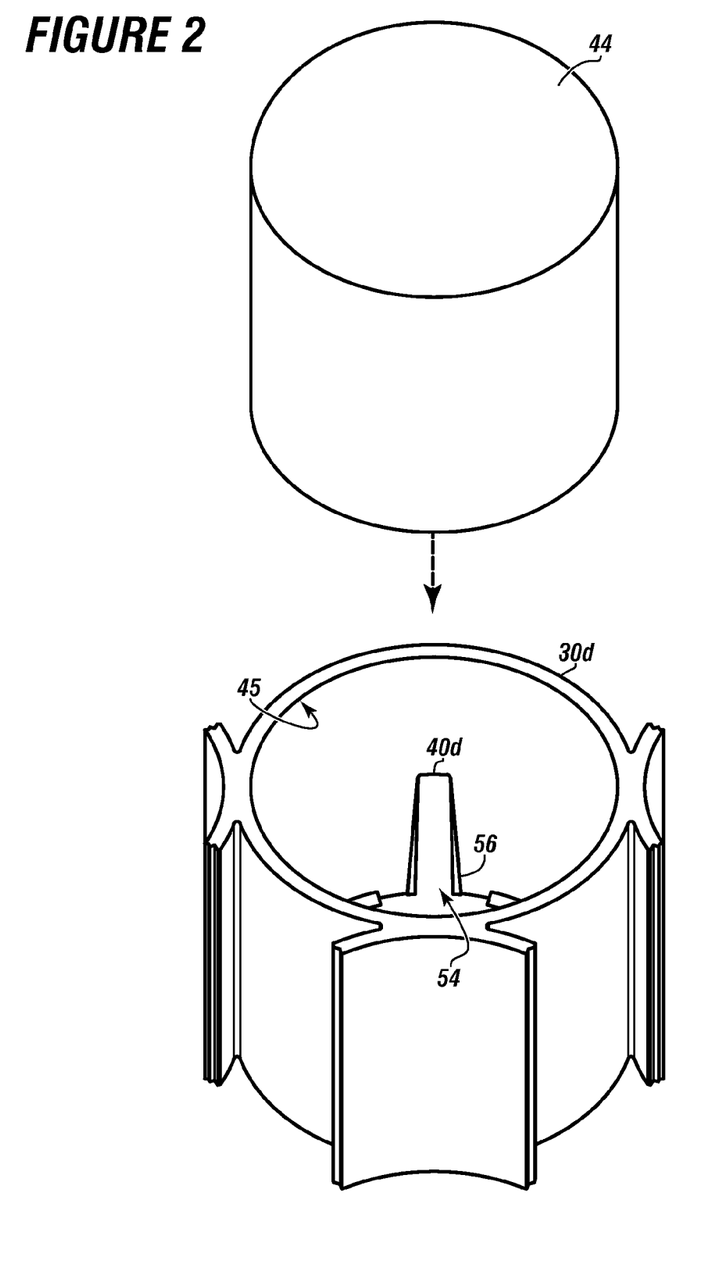
FIG. 2 depicts a detail of an inner surface of a cell of the one piece water permeable paver according to one or more embodiment with a parking marker.

FIG. 2 depicts a detail of an inner surface of a cell of the one piece water permeable paver according to one or more embodiment with a parking marker.

In embodiments, a parking marker 44 can be insertable into one of the cells to provide parking guidance to users, such as marking edges of parking spaces. This use of a parking marker enables a user to avoid the need for painting dirt, aggregate, or similar surface materials An inner surface 45 of an outer three connection cell 30d is shown with a fastening slot 40d.

The fastening slot 40d can be tapered from the bottom of the cell towards the top.

In embodiments, each fastening slot 40a-40l, shown here as 40d, can have an alignment opening 54 formed in the fastening slot for engaging a locking tab.

In embodiments, each fastening slot 40a-40l, shown here as 40d, can have a tensioning rib 56 adjacent the fastening slot. In embodiments, a tensioning rib can be positioned on both sides of the fastening slot.

Figure 3:
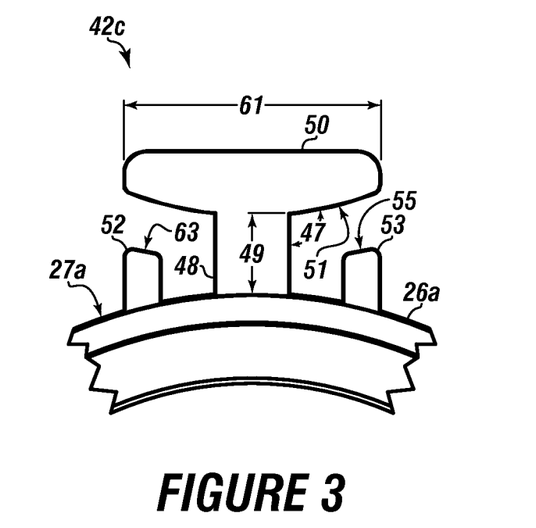
FIG. 3 depicts a detail of a locking tab according to one or more embodiments.

FIG. 3 depicts a detail of a locking tab 42c according to one or more embodiments.

The locking tab 42c can have a shaft 48 with a shaft length 49 connected to the outer surface 27a of one of the outer flex joint connection cells 26a.

The locking tab 42c can have a head 50 connected to the shaft 48 at an angle 47. The angle 47 can be an angle from 80 degrees to 110 degrees from an axis of the shaft 48.

The locking tab 42c can have a head 50 with a head length 61. The head length 61 for the locking tabs can be larger than the shaft length 49.

The head 50 can have a load surface 51. The load surface 51 can have a slope that matches an inner surface curvature of a cell enabling the head to mate with a fastening slot.

A first sloped edge 52 can extend from the outer surface 27a of the outer flex joint connection cell 26a. The first sloped edge can be parallel with and spaced apart from the shaft 48 and also in a spaced apart relationship to the head 50.

An outer edge 63 of the first sloped edge 52 can have a curvature complimentary to the outer surface curvature of a cell with a fastening slot into which the head interlocks.

The outer length aspect of the first sloped edge 52 can have a width larger where the first sloped edge attaches to the outer surface 27a than the width at the outer edge 63. The first sloped edge can be tapered in embodiments.

A second sloped edge 53 can extend from the outer surface 27a of the outer flex joint connection cell 26a.

The second sloped edge 53 can be parallel with and spaced apart from the shaft 48 and can also be in a spaced apart relationship to the head 50.

The second sloped edge 53 can be opposite the first sloped edge 52.

An outer edge 55 of the second sloped edge 53 can have a curvature complimentary to the outer surface curvature of a cell with a fastening slot into which the head interlocks.

The outer length aspect of the second sloped edge 53 can have a width larger where the second sloped edge attaches to the outer surface 27a than the width at the outer edge 55. The second sloped edge can be tapered in embodiments.

Figure 4:
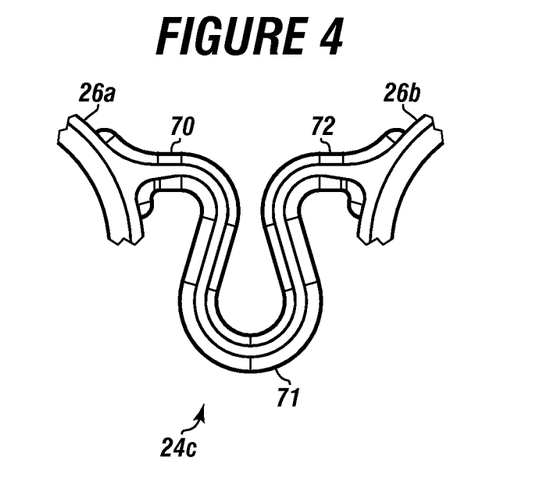
FIG. 4 depicts a detail of a flex joint according to one or more embodiments.

FIG. 4 is a detail of a flex joint 24c according to one or more embodiments.

In embodiments, each flex joint can have a first arm 70, a body 71, and a second arm 72.

The body 71 can be twice as long as either the first arm or the second arm.

The first arm 70 can connect to outer flex joint connection cell 26a and the second arm 72 can connect to the outer flex joint connection cell 26b.

In embodiments, the body can be U shaped.

Figure 5:
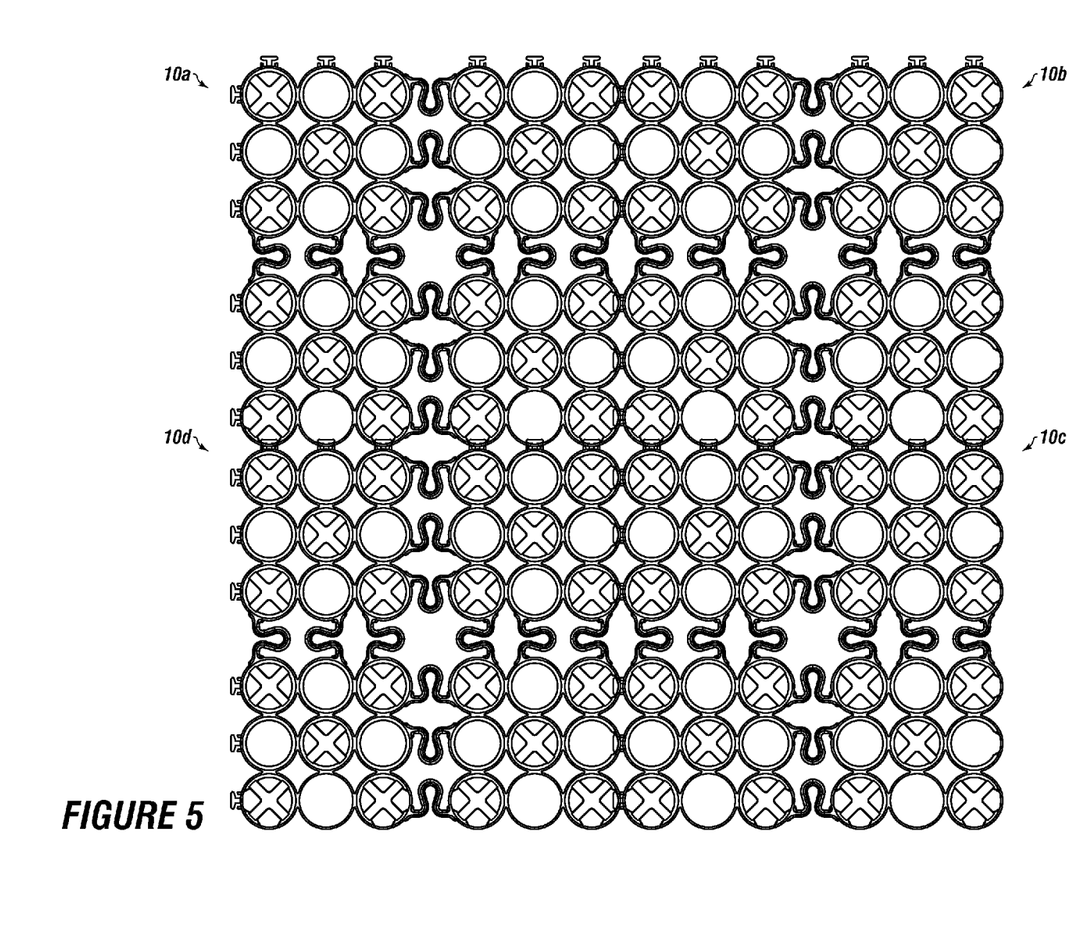
FIG. 5 depicts four interlocked one piece water permeable pavers according to one or more embodiments.

FIG. 5 depicts an assembly of a plurality of one piece water permeable pavers 10a-10d connected together according to one or more embodiments.

One piece water permeable paver 10a can be connected to one piece water permeable paver 10b using the locking tabs and fastening slots.

One piece water permeable paver 10a can be connected to one piece water permeable paver 10d using the locking tabs and fastening slots.

One piece water permeable paver 10b can be connected to one piece water permeable paver 10c using the locking tabs and fastening slots.

One piece water permeable paver 10c can be connected to one piece water permeable paver 10d using the locking tabs and fastening slots.

In embodiments, the one piece water permeable paver can be made from recycled plastics, such as milk bottles.

In embodiments, the one piece water permeable paver can be pigmented with soy based pigments to be environmentally friendly.

Installing the one piece water permeable pavers can be a simple six step process.

The process can include clearing and grading a ground surface, as the first step. This clearing and grading can be done by hand with a shovel for a small area or with a bulldozer for a large area.

The process can include laying and spreading ½ an inch to 8 inches of ½ inch to 1 and ½ inch diameter rock or gravel onto the cleared and graded ground, as the second step. This layer of rock or gravel can be compacted or compressed with a roller or compactor.

The process can include preassembling the one piece water permeable pavers into four interconnected pavers with the locking tabs interlocking into the slots, as the third step.

The process can include placing the preassembled one piece water permeable pavers over the compacted or compressed rock or gravel, as the fourth step.

The process can include dumping the aggregate into the cells of the one piece water permeable pavers, as the fifth step. From ¾ inch to 1 and ½ inch rock, recycled asphalt, or other aggregate can be used to evenly fill the cells.

The process can also include compacting the filled cells, forming a parking lot or traffic surface ready to use for 25 plus years without maintenance, as the sixth step.

A process to create a stabilized water permeable grass parking or traffic surface can include performing steps one, two, three and four as described above. After laying the pavers, the process can include filling the cells of the one piece water permeable pavers with soil instead of aggregate and installing seed or sod as desired.

Foot paths can also be created with the one piece water permeable pavers. Any size path can be made with the one piece water permeable pavers.

While these embodiments have been described with emphasis on the embodiments, it should be understood that within the scope of the appended claims, the embodiments might be practiced other than as specifically described herein.

What is claimed is:

1. A one piece water permeable paver for forming a surface suitable for supporting traffic, comprising:
    a. a plurality of flex joints;
    b. a plurality of outer flex joint connection cells, each outer flex joint connection cell connecting to one of a plurality of flex joints, each outer flex joint connection cell having an outer flex joint connection cell outer surface;
    c. a plurality of outer three connection cells, each outer three connection cell connecting to one of the outer flex joint connection cells, each outer three connection cell having an outer three connection cell outer surface;
    d. a plurality of outer two connection cells, each outer two connection cell connected to two outer three connection cells, each outer two connection cell having an outer two cell connection outer surface;
    e. a plurality of inner single flex joint connection cells, each inner single flex joint connection cell connected to one of the flex joints;
    f. a plurality of inner dual flex joint connection cells, each inner dual flex joint connection cell engaging two flex joints simultaneously;
    g. a plurality of inner four connection cells, each inner four connection cell connecting to a pair of outer three connection cells and a pair of inner single flex joint connection cells; with the connected cells forming the one piece water permeable paver having a first side, a second side opposite the first side, a third side between the first side and the second side, and a fourth side between the first side and the second side opposite the third side, and also forming a top and a bottom;
    h. a plurality of fastening slots formed partially through outer surfaces of cells that form the second side and the fourth side; and
    i. a plurality of locking tabs extending from outer surfaces of cells that form the first side and the third side, wherein the locking tabs for a first one piece water permeable paver engage fastening slots of an second one piece water permeable paver.

2. The one piece water permeable paver of claim 1, comprising a parking marker insertable in one of the cells.

3. The one piece water permeable paver of claim 1, wherein the plurality of outer flex joint connection cells connect on the outer surface of the outer flex joint connection cell at clock positions on the outer surface consisting of: a 12 o'clock position, a 3 o'clock position, a 6 o'clock position and a 9 o'clock position.

4. The one piece water permeable paver of claim 1, wherein the plurality of outer three connection cells are connected to one of the outer flex joint connection cells, one of the outer two connection cells and one inner four connection cell at clock positions on the outer surface of the outer three connection cells consisting of: a 12 o'clock position, a 3 o'clock position, a 6 o'clock position and a 9 o'clock position.

5. The one piece water permeable paver of claim 1, wherein the plurality of outer two connection cells connect to two outer three connection cells at clock positions on the outer surface of the outer two connection cells consisting of: a 12 o'clock position, a 3 o'clock position, a 6 o'clock position and a 9 o'clock position.

6. The one piece water permeable paver of claim 1, wherein the plurality of inner flex joint connection cells connected to a flex joint at a clock position on the outer surface of the inner flex joint connection cell consisting of a 12 o'clock position, a 3 o'clock position, a 6 o'clock position and a 9 o'clock position.

7. The one piece water permeable paver of claim 1, wherein the plurality of inner dual flex joint connection cells connect to a flex joint at a clock position on the outer surface of each inner dual flex joint connection cell consisting of: a 12 o'clock position, a 3 o'clock position, a 6 o'clock position and a 9 o'clock position.

8. The one piece water permeable paver of claim 1, wherein the inner four connection cells connect to adjacent cells joint at a clock position on the outer surface of each four connection inner cell consisting of: a 12 o'clock position, a 3 o'clock position, a 6 o'clock position and a 9 o'clock position.

9. The one piece water permeable paver of claim 1, wherein the plurality of locking tabs formed on the outer surface of the outer cells extend from the bottom of the one piece water permeable paver.

10. The one piece water permeable paver of claim 1, wherein the plurality of fastening slots are cut from the bottom of the one piece water permeable paver partially through the outer surface towards the top.

11. The one piece water permeable paver of claim 1, wherein each locking tab of the plurality of locking tabs comprises:
    a. a shaft with a shaft length connected to the outer surface of an outer cell on the first side and the third side of the one piece water permeable paver;
    b. a head connected to the shaft at an angle with a slope from 80 degrees to 110 degrees from the shaft, the head having a load surface that mates with an inner surface curvature of an outer cell;
    c. a first sloped edge extending from the outer surface, the first sloped edge extending parallel with and spaced apart from the shaft and also in a spaced apart relationship to the head; and
    d. a second sloped edge extending from the outer surface, the second sloped edge extending parallel with and spaced apart from the shaft and also in a spaced apart relationship to the head and opposite the first sloped edge.

12. The one piece water permeable paver of claim 1, wherein at least one fastening slot is tapered from the bottom of the one piece water permeable paver narrowing towards the top.

13. The one piece water permeable paver of claim 1, wherein at least one fastening slot has an alignment opening formed in the fastening slot for engaging the locking tab.

14. The one piece water permeable paver of claim 1, comprising at least one tensioning rib adjacent one of the fastening slots, wherein the tensioning rib is formed on the inner side of a cell.

15. The one piece water permeable paver of claim 1, wherein each flex joint has a first arm connected to a body and a second arm connected to the body, wherein each arm engages a different cell.

16. The one piece water permeable paver of claim 1, wherein each cell has an inner flange mounted to the inner surface of each cell, the inner flange extending toward a center point of each cell, and the inner flange mounted to extend from the bottom of the one piece water permeable paver.

17. The one piece water permeable paver of claim 1, comprising at least one of: an X-shaped anchor connected to the inner surface of outer flex joint connection cells, and an X-shaped anchor connected to the inner surface of inner dual flex joint connection cells, an X-shaped anchor connected to an inner surface of outer two connection cells, and an X-shaped anchor connected to an inner surface of four connection inner cells.

18. The one piece water permeable paver of claim 1, wherein the body of the flex joint is twice as long as either the first arm or the second arm.

19. The one piece water permeable paver of claim 18, wherein the body is U-shaped.

\* \* \* \* \*